(12) United States Patent
Rodarte

(10) Patent No.: US 11,906,818 B1
(45) Date of Patent: Feb. 20, 2024

(54) EARPIECE-LESS EYEGLASSES

(71) Applicant: Michael Renee Rodarte, Graden Grove, CA (US)

(72) Inventor: Michael Renee Rodarte, Graden Grove, CA (US)

( * ) Notice: Subject to any disclaimer, the term of this patent is extended or adjusted under 35 U.S.C. 154(b) by 0 days.

(21) Appl. No.: 18/348,213

(22) Filed: Jul. 6, 2023

Related U.S. Application Data

(63) Continuation-in-part of application No. 17/890,886, filed on Aug. 18, 2022, now Pat. No. 11,835,796.

(51) Int. Cl.
*G02C 5/12* (2006.01)
*G02C 7/08* (2006.01)

(52) U.S. Cl.
CPC ............. *G02C 5/128* (2013.01); *G02C 7/086* (2013.01)

(58) Field of Classification Search
CPC . G02C 3/003; G02C 5/02; G02C 7/08; G02C 7/086; G02C 7/088; A63B 33/002; A63B 33/004; A63B 33/006; A61F 9/02; A61F 2009/021
See application file for complete search history.

(56) References Cited

U.S. PATENT DOCUMENTS

| | | | |
|---|---|---|---|
| 4,468,819 A | 9/1984 | Ohno | |
| 4,796,986 A * | 1/1989 | Gowdy, Jr. | ............ G02C 7/086 351/149 |
| 5,467,148 A | 11/1995 | Conway | |
| 5,949,514 A | 9/1999 | Wargon | |
| 6,112,334 A | 9/2000 | Chiang | |
| 6,289,523 B1 | 9/2001 | Chiang | |
| 6,648,471 B1 * | 11/2003 | Dalrymple | ............. G02C 3/003 351/111 |
| 7,883,205 B2 | 2/2011 | Begg | |
| 9,642,749 B2 | 5/2017 | McNeal et al. | |
| 2002/0109818 A1 * | 8/2002 | Okui | ........................ G02C 1/06 351/86 |
| 2002/0194669 A1 | 12/2002 | Takeshi et al. | |

(Continued)

FOREIGN PATENT DOCUMENTS

| | | | |
|---|---|---|---|
| FR | 2700861 A1 | 7/1994 | |
| FR | 2726373 A1 * | 5/1996 | ........... G02C 13/003 |

(Continued)

OTHER PUBLICATIONS

Machine translation of FR 2726373 retrieved electronically from PE2E Search Aug. 30, 2023 (Year: 2023).*

(Continued)

*Primary Examiner* — Cara E Rakowski
(74) *Attorney, Agent, or Firm* — Cybernetic Law PLLC; John Hocker

(57) ABSTRACT

Earpiece-less glasses including an interchangeable left eye frame, an interchangeable right eye frame and a nose piece connecting the left eye frame to the right eye frame. The left eye frame and the right eye frame each provide eye lens pockets configured to hold and snuggly fit a respective first eye lens in the respective pockets. The left eye frame and the right eye frame each provide an opening to the pockets so that the first lenses can be replaced with second lenses. A magnification strength of the first lenses may be different from the magnification strength of the second lenses.

20 Claims, 12 Drawing Sheets

(56) References Cited

U.S. PATENT DOCUMENTS

| | | |
|---|---|---|
| 2004/0218140 A1 | 11/2004 | Bleau |
| 2009/0038063 A1 | 2/2009 | Chou |
| 2010/0024098 A1 | 2/2010 | Chiang |
| 2010/0309425 A1* | 12/2010 | Zelazowski .......... G02C 5/2209 351/138 |
| 2014/0115760 A1 | 5/2014 | Waller et al. |
| 2021/0030593 A1 | 2/2021 | Kellogg |
| 2021/0308530 A1* | 10/2021 | Song .................... A63B 33/006 |
| 2022/0107507 A1 | 4/2022 | Tomlinson et al. |

FOREIGN PATENT DOCUMENTS

| | | | | |
|---|---|---|---|---|
| GB | 2380558 A | | 4/2003 | |
| GB | 2460448 A | | 12/2009 | |
| GB | 2501562 A | * | 10/2013 | ............ G02C 7/086 |
| KR | 20090132433 A | * | 12/2009 | |
| KR | 10-1524149 B1 | * | 5/2015 | ............ G02C 11/04 |

OTHER PUBLICATIONS

Machine translation of KR 10-1524149 retrieved electronically from PE2E Search Aug. 30, 2023 (Year: 2023).*

Machine translation of KR 20090132433 retrieved electronically from PE2E Search Aug. 30, 2023 (Year: 2023).*

Final Office Action dated Nov. 15, 2022 mailed in U.S. Appl. No. 17/890,886.

Non-Final Office Action dated Mar. 3, 2023 mailed in U.S. Appl. No. 17/890,886.

Non-Final Office Action dated Oct. 3, 2022 mailed in U.S. Appl. No. 17/890,886.

Notice of Allowance dated Jul. 26, 2023 mailed in U.S. Appl. No. 17/890,886.

Rimless clip on nose glasses, Retrieved from Internet, Retrieved on May 27, 2022 <URL:https://www.amazon.com/Colors-glasses-Morpheus-rimless-sunglasses/dp/B075M9WVYH>.

* cited by examiner

EARPIECE-LESS EYEGLASSES

CROSS-REFERENCE TO RELATED APPLICATIONS

This Continuation-in-Part application is based on and claims priority to U.S. Nonprovisional patent application Ser. No. 17/890,886, filed on Aug. 18, 2022, in the U.S. Patent & Trademark Office, the entire disclosure of which is incorporated herein by reference in its entirety.

BACKGROUND OF THE INVENTION

1. Technical Field

Exemplary embodiments generally relate to eyeglasses. More specifically, the embodiments relate to a pair of eyeglasses that rest upon the user's nose, allowing ease of access to the entire face without temples/earpieces/arms of standard glasses being in the way.

2. Description of the Related Art

Various eyeglasses are generally available. For example, eyeglasses conventionally included temples, which are long arms that extend beyond a wearer's ears to support the eyeglasses being firmly held onto a wearer's face. Temples, however, may be undesirable because they may cause interference with, for example, a make-up application process, or hair styling or could interfere with over the ear headphones that could press against the temple arms of regular glasses and hurt the side of your head.

In addition, lenses of eyeglasses may need to be changed. But the process of replacing lenses is not user-friendly.

Therefore, there is a need in the art for earpiece-less eyeglasses that are capable of maintaining contact with a wearer's face without temple arms, and more particularly, for earpiece-less eyeglasses that provide a capability to allow a user to rapidly change lenses.

The above information is presented as background information only to assist with an understanding of the disclosure. No determination has been made, and no assertion is made, as to whether any of the above might be applicable as prior art regarding the disclosure.

SUMMARY

Aspects of the disclosure are to address at least the above-mentioned problems and/or disadvantages and to provide at least the advantages described below. Accordingly, an aspect of the disclosure is to provide an earpiece-less glasses including an interchangeable left eye frame, an interchangeable right eye frame and a nose piece connecting the left eye frame to the right eye frame. The left eye frame and the right eye frame each provide eye lens pockets configured to hold and snuggly fit a respective first eye lens in the respective pockets. Snugly fit may mean the pocket and respective lens are each similarly contoured so that the lens will not fall out or shake while in the pocket but can be removed when a pulling force is exerted on the protrusions (e.g., 724B1-A and 724B1-B, or 744B1-A and 744B1-B of FIGS. 8B and 8C, respectively). The left eye frame and the right eye frame each provide an opening to the pockets so that the first lenses can be replaced with second lenses. A magnification strength of the first lenses may be different from the magnification strength of the second lenses.

According to an embodiment, earpiece-less eyeglasses may be provided. The earpiece-less eyeglasses may include a left eye frame and a right eye frame, and a nose piece connecting the left eye frame to the right eye frame. The left eye frame provides a left eye lens pocket configured to hold and snuggly fit a first left eye lens in the left eye lens pocket. The right eye frame provides a right eye lens pocket configured to hold and snuggly fit a first right eye lens in the right eye lens pocket. The left eye pocket is configured to snuggly hold the first left eye lens and the right eye pocket is configured to snuggly hold the first right eye lens, the left eye frame provides a left opening of the left eye pocket on an outer left surface of the left eye frame, and the right eye frame provides a right opening of the right eye pocket on an outer right surface of the left eye frame.

The left eye lens and the right eye lens are each configured to be gripped by an opposable thumb and finger and pulled away from the nose piece. The left eye lens and the right eye lens may include at least a pair of external protrusions, and the respective pairs of external protrusions are configured to be gripped by an opposable thumb and finger and pulled away from the nose piece by pulling on the pair of external protrusions.

The nose piece provides at least a portion of a left eye frame attaching means and at least a portion of a right eye frame attaching means, the left eye frame attaching means removably attaches the left eye frame to the nose piece, and the right eye frame attaching means removably attaches the right eye frame to the nose piece.

The left eye frame attaching means includes a left eye frame magnet provided in the left eye frame and a left eye nose magnet provided in the nose piece, and the right eye frame attaching means includes a right eye frame magnet provided in the right eye frame and a right eye nose magnet provided in the nose piece. The portion of the left eye frame attaching means included in the nose piece includes a left eye frame receiving channel, and the portion of the right eye frame attaching means included in the nose piece includes a right eye frame receiving channel.

The left eye frame attaching means includes a left eye frame connecting pin provided on a left eye frame column extending from the left eye frame, the right eye frame attaching means includes a right eye frame connecting pin provided on a right eye frame column extending from the right eye frame, the left eye frame receiving channel is configured to engage with the left eye frame connecting pin and hold the left eye frame stably to the nose piece, and the right eye frame receiving channel is configured to engage with the right eye frame connecting pin and hold the right eye frame stably to the nose piece, whereby the left eye frame attaching means comprises the left eye frame receiving channel. The left eye frame column and the left eye connection pin and the right eye attaching means comprises the right eye frame receiving channel, the right eye frame column, and the left eye frame connection pin. The left eye frame column and the right eye frame column are each cylindrically-shaped columns. The magnification lens includes grip able (graspable) protrusions.

According to an embodiment, a method of changing an eyeglass lens while a pair of eyeglasses is being worn may be provided. The method may include: providing a pair of eyeglasses worn by a wearer, the pair of eyeglasses including two eye unit frames, and the two eye unit frames include a first eye unit frame including a first eyeglass lens within a pocket of the eye unit frame, the first eyeglass lens including nubs provided on an outer edge surface of the first eyeglass lens; gripping, using an opposable thumb and finger, the nubs of the first eyeglass lens; moving, using the gripped nubs of the first eyeglass lens, the first eyeglass lens in a lateral direction away from a nose area of the pair of eyeglasses worn by a wearer; providing a second eyeglass lens including nubs on an outer edge surface of the second eyeglass lens; gripping, using an opposable thumb and finger, the nubs of the second eyeglass lens; and moving, using the gripped nubs of the second eyeglass lens, the second eyeglass lens in a lateral direction towards the nose area and into the pocket, wherein the lateral direction towards the nose area of the pair of eyeglasses worn by the wearer is an opposite direction compared to the lateral direction away from the nose area of the pair of eyeglasses worn by the wearer.

According to an embodiment, a method of assembling earpiece-less glasses includes providing a first earpiece-less eyeglass frame configured to be used with a human's left eye and providing a second earpiece-less eyeglass frame configured to be used with a human's right eye; providing a nose piece having two hollow cylindrical receiving portions; and connecting the two earpiece-less eyeglass frames to the nose piece via an attachment means.

The method of assembling a pair of eyeglasses may further comprise attaching two metal connectors inside of the receiving portions of the nose piece; and attaching two eye unit frames to the top two pieces of the metal connectors. The method may further comprise providing a magnet inside of a top portion of a metal connector and a magnet inside of a bottom portion of the metal connector. The method may further comprise snapping the top portion and the bottom portion together using a connection pin provided with the top portion and a channel provided in the bottom portion.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness. The terminology used herein is for the purpose of referring to specific embodiments only, and is not intended to limit the invention.

As used herein, the singular forms "a," "an," and "the" include the plural forms unless the context clearly indicates otherwise. Thus, for example, reference to "an element" includes reference to one or more of such elements. The meaning of "comprising," as used herein, specifies a particular characteristic, region, integer, step, operation, element and/or component, and other specific characteristic, region, integer, step, operation, element, component, and/or group. It does not exclude the existence or addition of anything.

With reference to the accompanying drawings, the embodiments of the disclosure will be described in detail so that those of ordinary skill in the art can easily carry out the embodiments. However, the inventive concepts may be embodied in several different forms and is not limited to the embodiments described herein.

Figure 1:
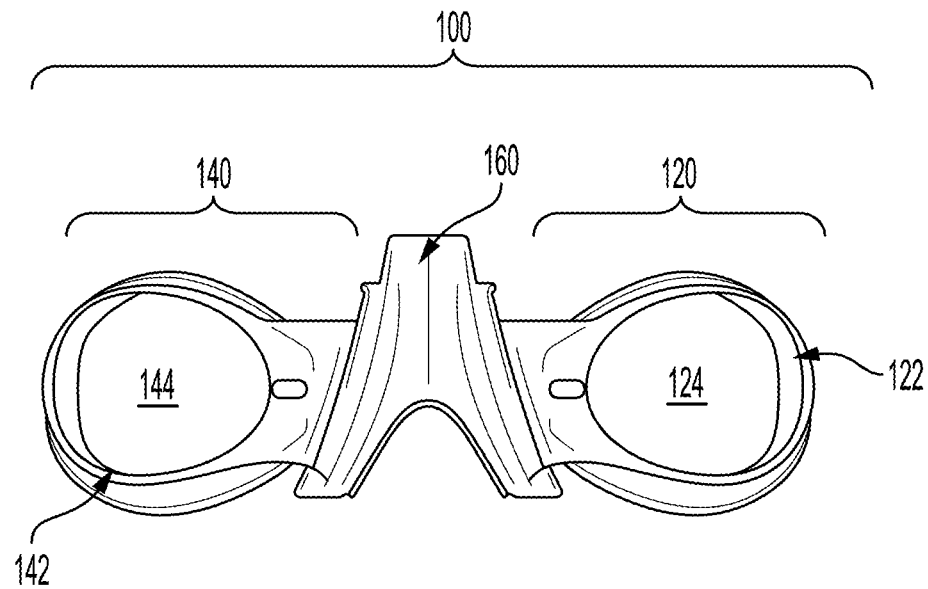
FIG. 1 illustrates a front view of a pair of earpiece-less eyeglasses, according to an embodiment of the disclosure.

FIG. 1 illustrates a front view of a pair of earpiece-less eyeglasses 100, according to an embodiment of the disclosure. FIG. 1 illustrates the eyeglasses 100 comprising a first (left side) eye unit 120 and a second (right side) eye unit 140

(left and right being from the perspective of the wearer of the eyeglasses 100 while wearing the eyeglasses 100). As shown in FIG. 1, the first eye unit 120 may include a first body lip 122 configured to stably hold a first lens 124 and the second eye unit 140 may include a second body lip 142 configured to stably hold a second lens 144. The first body lip 122 and second body lip 142 are made out of a plastic material but also may be made out of carbon fiber and/or metallic metal. The first and second lenses 124 and 144 may include at least one transparent lens. The eyeglasses 100 may also include a nose piece 160 that stably connects the first (left side) eye unit 120 to the (right side) eye unit 140.

Figure 2:
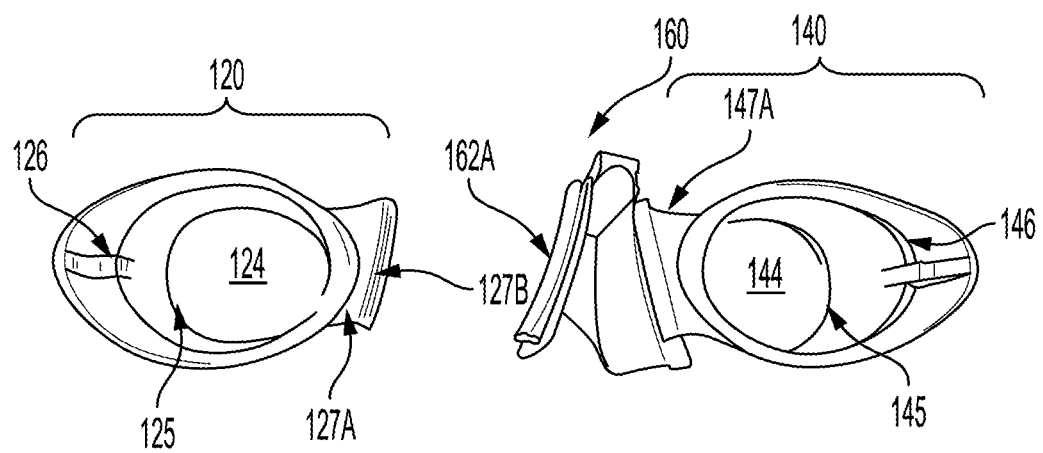
FIG. 2 illustrates a rear view of a pair of earpiece-less eyeglasses, according to an embodiment of the disclosure.
Figure 3:
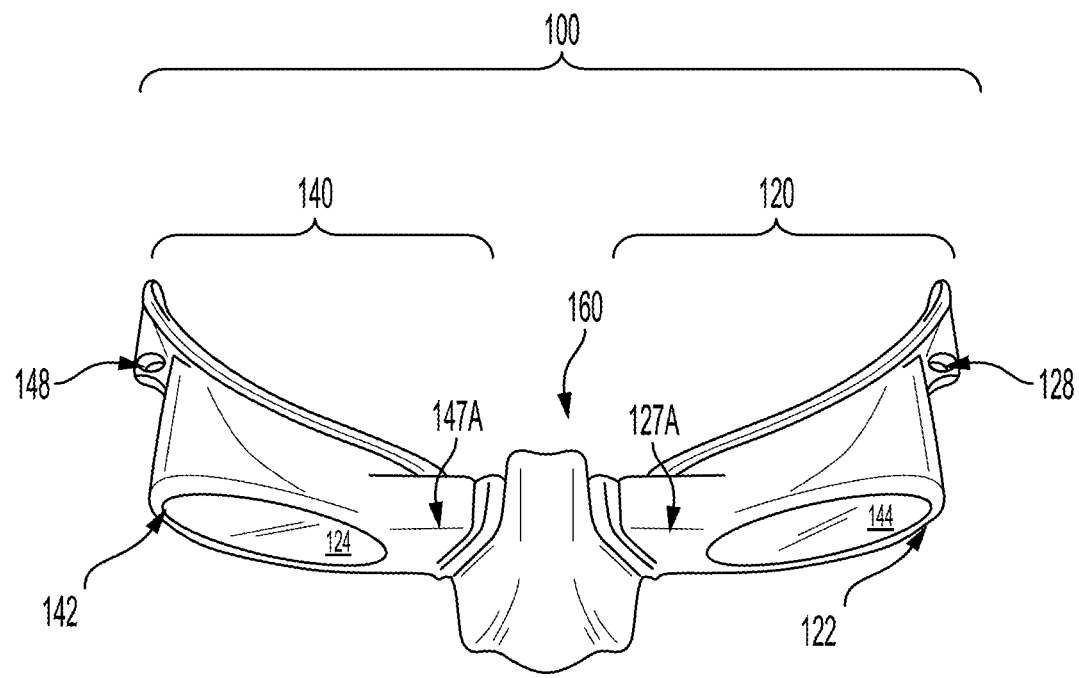
FIG. 3 illustrates a top view of a pair of earpiece-less eyeglasses, according to an embodiment of the disclosure.

FIG. 2 illustrates a rear view of a pair of earpiece-less eyeglasses 100, according to an embodiment of the disclosure. FIG. 3 illustrates a top view of a pair of earpiece-less eyeglasses, according to an embodiment of the disclosure.

As shown in FIG. 2, the first eye unit 120 may further comprise a first socket body wall 125, a first socket body ring 126 and a connection portion 127A having a connection means 127B. As shown in FIGS. 2 and 3, the second eye unit 140 may include a second socket body wall 145, a second socket body ring 146, and a second connection portion 147A.

According to an embodiment, as shown in FIG. 2, the first socket body wall 125 and the second socket body wall 145 are each a cylinder having a radius longer than the length and having an oval cross-sectional shape that extends farther in a direction away from a respective connection portion (e.g., first connection portion 127A or second connection portion 147A) than towards the respective connection means.

According to an embodiment, as shown in FIG. 2, perimetrically attached to the first socket body wall 125, which is configured to directly contact a wearer's human face, is the first socket body ring 126. Perimetrically attached to the second socket body wall 145, which is configured to directly contact a wearer's human face, is the second socket body ring 146. According to an embodiment, as shown in FIG. 2, the first socket body ring 126 and the second body ring 146 are each designed to form a seal around one of a wearer's eyes, preventing debris from entering the wearer's eyes.

According to an embodiment, as shown in FIG. 1, perimetrically positioned around the first socket body wall 125, opposite the end where the first socket body ring 126 is located, is a first socket body lip 122. Perimetrically positioned around the second socket body wall 145, opposite the end where the second socket body ring 146 is located, is a second socket body lip 142.

As shown in FIGS. 1 and 3, the first socket body lip 122 is also perimetrically attached to the first lens 124, and the second socket body lip 142 is also perimetrically attached to the second lens 122 (e.g., see also FIG. 1). The lenses 124 and 144 may be equipped to be removed and allow for lenses of a different prescription to be used.

Each of the first eye unit 120 and the second eye unit 140 are equipped with an attaching means integrated with or connected to the connection portion (e.g., connection portion 127A and/or connection portion 147A). For example, as shown in FIGS. 2 and 3, extending inward towards the nose piece 160 from the first eye unit 120, is the first connection portion 127A and the second connection portion 147A. The first connection portion 127A forms a bridge connecting the first eye unit 120 to the nose piece 160. Likewise, as shown in FIGS. 2 and 3, extending inward towards the nose piece 160 from the second eye unit 120, is the second connection portion 147A. The first connection portion 127A forms a first bridge connecting the first eye unit 120 to the nose piece 160, while the second connection portion 147A forms a second bridge connecting the second eye unit 120 to the nose piece 160.

As shown in FIG. 2, the first connection portion 127A may include a first attaching means 127B, allowing the first eye unit 120 to be easily attached/detached to/from the nose piece 160 (or replaced (exchanged out) in the event a user's prescription changes and a new lens is needed). For example, FIG. 2 shows the first connection portion 127A may include a first attaching means 127B, which may be a first attachment groove 127B configured to engage (e.g., slidably engage) with the first attachment bar 162A of the nose piece 160, thereby attaching/attaching the first eye unit 120 to the nose piece 160. The first connection portion 127A has a first attachment groove 127B traversing the length of the first connection portion 127A, allowing the first connection portion 127A to be slidably attached to the attachment bar 162A of the nose piece 160.

Figure 6:
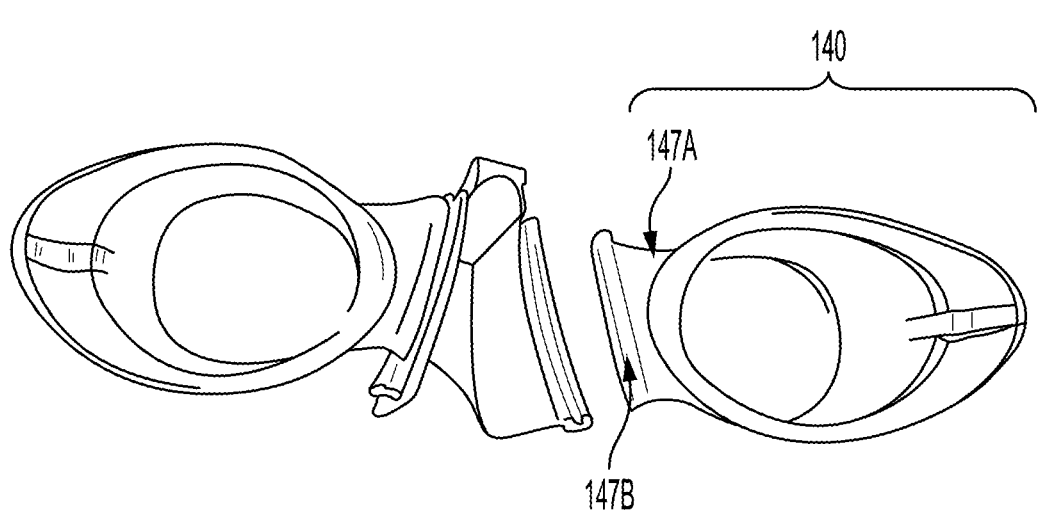
FIG. 6 illustrates a rear perspective view of a pair of earpiece-less eyeglasses with the right eye unit in a detached state, according to an embodiment of the disclosure.

As shown in FIG. 6, the second connection portion 147A may include a second attaching means 147B, allowing the second eye unit 140 to be easily attached/detached to/from the nose piece 160 (or replaced (exchanged out) in the event a user's prescription changes and a new lens is needed). For example, FIG. 6 shows the second connection portion 147A may include a second attaching means 147B, which may be a second attachment groove 147B configured to engage (e.g., slidably engage) with the second attachment bar 162B of the nose piece 160, thereby attaching/attaching the second eye unit 120 to the nose piece 160. For example, FIG. 6 shows the second connection portion 147A has a second attachment groove 147B traversing the length of the second connection portion 147A, allowing the second connection portion 147A to be slidably attached to the attachment bar 162A of the nose piece 160.

As shown in FIGS. 1-3, the first socket body ring 126 is designed to form a seal around the wearer's eye, preventing debris from entering the wearer's eye. Perimetrically positioned around the first socket body wall 125, opposite the end where the first socket body ring 126 is located, is the first socket body lip 122. The first socket body lip 122 is also perimetrically attached to the first lens 124. The lenses 124 and 144 may be equipped to be removed and allow for lenses of a different prescription to be used.

As shown in FIG. 3, angularly attached to the first eye unit 120, where the first socket body ring and the first socket body wall attach, is a first through hole or loop 128, and angularly attached to the second eye unit 140, where the second socket body ring and the second socket body wall attach, is a second loop 148. The first through hole 128 and the second through hole 148 are each configured to allow a string or cord to be inserted through and tied in a knot, while another end of the string or cord is connected from the first loop 128 to the second loop 148 allowing the wearer additional security in keeping the eyewear in place on a wearer's face.

According to an embodiment, the nose piece 160 is made out of plastic. According to an embodiment, the nose piece has a bent shape. According to an embodiment, the nose piece 160 is configured to lay in tandem with the nose of a wearer (e.g., by being contoured to fit on a face of a wearer). As shown in FIG. 3 for example, the nose piece 160 is positioned between the first eye unit 120 and the second eye unit 140 and may be held in place by way of an attaching means on each eye unit.

Figure 4:
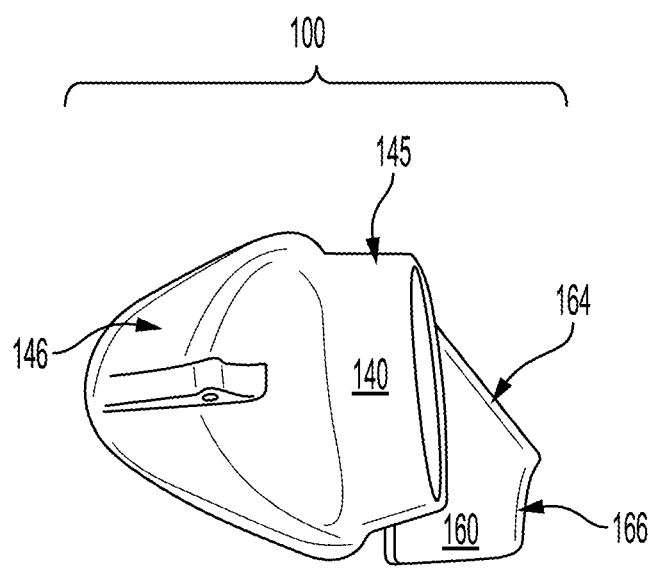
FIG. 4 illustrates a right side—perspective view of a pair of earpiece-less eyeglasses, according to an embodiment of the disclosure.

FIG. 4 illustrates a right side-perspective view of a pair of earpiece-less eyeglasses, according to an embodiment of the disclosure. As illustrated in FIG. 4, the nose piece 160 comprises a nose bridge 164 and a nose cavity 166. The nose piece 160 has a nose cavity 166 formed at the bottom front of the nose bridge 164, allowing the tip of the user's nose to be protected as shown in FIG. 4.

As shown in FIGS. 1-6, the second eye unit 140 may be similar or substantially the same as the first eye unit 120. In particular, the second eye unit 140 may have corresponding parts as the first eye unit 120, even if all are not shown. For example, the second eye unit 140 may include an attachment means 147B (shown in FIG. 6 and hidden by nosepiece 160 in FIG. 2) that is configured the same or similarly as the attachment means 127B. While explaining the eyeglasses according to embodiments of the disclosure, a detailed description of the contents overlapping with the eyeglasses according to the embodiments will be omitted (e.g., redundant unlabeled features). Left eye unit features, unless explicitly explained as being different, may operate similarly or the same as a right eye counterpart feature, according to various embodiments.

Figure 5:
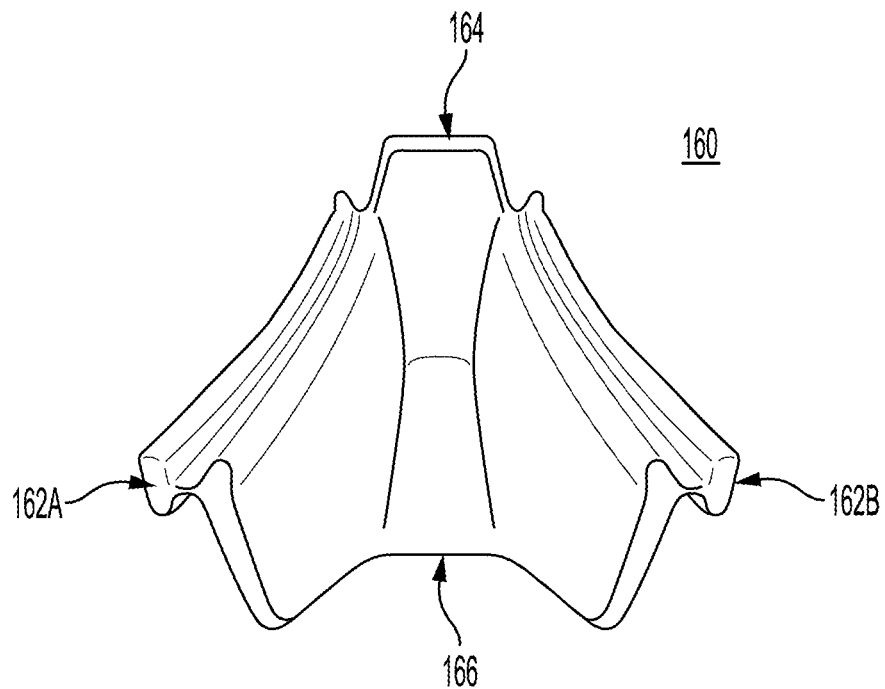
FIG. 5 illustrates a bottom view of a nose piece, according to an embodiment of the disclosure.

FIG. 5 illustrates a bottom view of a nose piece 160, according to an embodiment of the disclosure. As illustrated in FIG. 5, the nose piece 160 may further comprise a first attachment bar 162A and a second attachment bar 162B. The nose bridge 164 comprising a first attachment bar 162A positioned on the front left edge of the nose bridge 164 traversing the entire length of the nose bridge 164 from the top of the nose bridge 164 to the bottom of the nose bridge 164. The nose bridge 164 further comprising a second attachment bar 162B on the front right edge of the nose bridge 164 traversing the entire length of the nose bridge 162B from the top of the nose bridge 164 to the bottom of the nose bridge 164.

The first attachment bar 162A of FIG. 5 is configured to be slidably attached to the first attachment groove 127B of the first eye unit 120 (e.g., shown in FIG. 2) (forming a first attaching means). The second attachment bar 162B of FIG. 5 is configured to be slidably attached to the second attachment groove 147B of the second eye unit 140 (e.g., shown in FIG. 6) (forming a second attaching means). The slidably attachable/detachable components of a first attachment bar 162A attachable/detachable to the first groove 127B and the second attachment bar 162B attachable/detachable to the second groove 147B may each correspond an attaching means (e.g., a first attaching means of the first eye unit 120 and a second attaching means of the second eye unit 140). The glasses 100 of FIGS. 1-6 may be the same glasses 100 in each of FIGS. 1-6 but where the FIGS. 1-6 have different views (and FIG. 5 shows only the nose piece 160 of the glasses 100).

FIG. 6 illustrates a rear perspective view of a pair of earpiece-less eyeglasses with the right eye unit in a detached state, according to an embodiment of the disclosure. FIGS. 2, 3 and 6 show a transition from a first state, a second state and a third state of the eyeglasses. In FIG. 2, the first state is where the first eye unit 120 is unattached (separate) and the nose piece is attached/fastened to the second eye unit 140. The second state, as illustrated in FIG. 3) includes both the first eye unit 120 and the second eye unit 140 being fastened/attached to the nose piece 160, thereby forming a pair of eyeglasses.

Figure 7A:
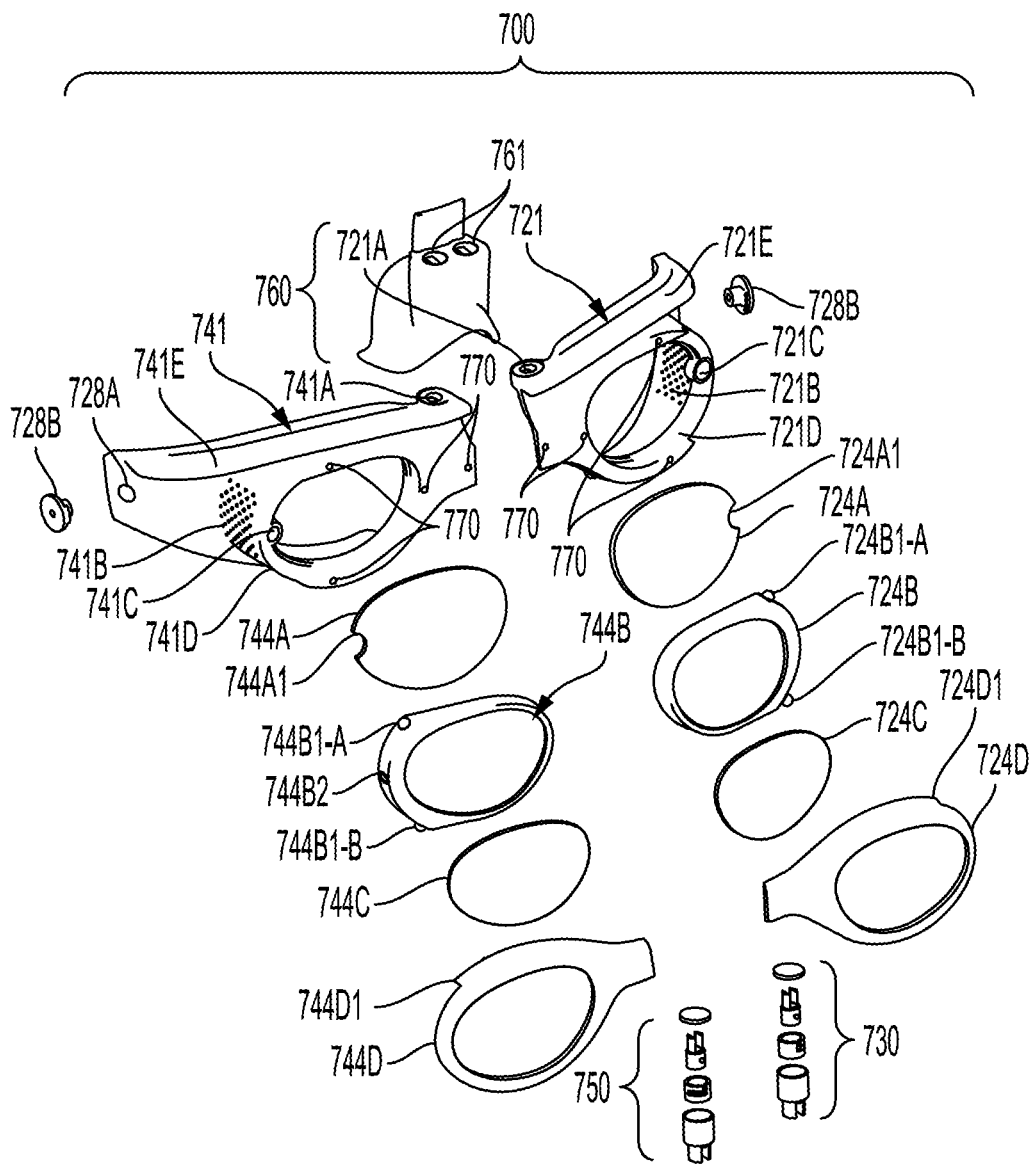
FIG. 7A illustrates an exploded front perspective view of a pair of earpiece-less eyeglasses, according to an embodiment of the disclosure.
Figure 7B:
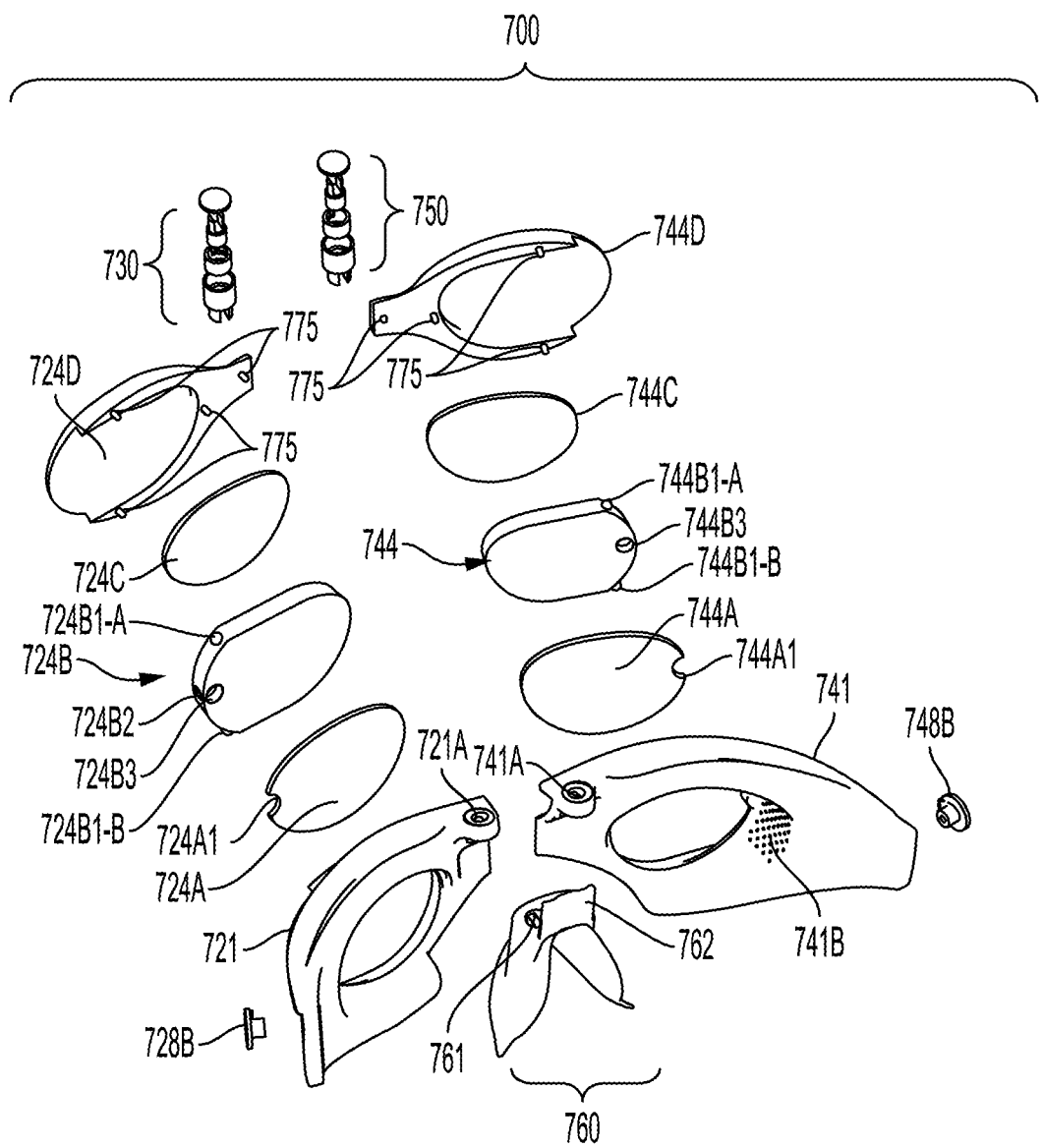
FIG. 7B illustrates an exploded rear perspective view of a pair of earpiece-less eyeglasses, according to an embodiment of the disclosure.

FIG. 7A illustrates a pre-assembly (or fully-disassembled, or exploded) front perspective view of a pair of earpiece-less eyeglasses 700, according to an embodiment of the disclosure, and FIG. 7B illustrates a pre-assembly (or fully disassembled) rear perspective view of a pair of earpiece-less eyeglasses 700, according to an embodiment of the disclosure. According to an embodiment, a pre-assembly pair of earpiece-less eyeglasses 700 (e.g., shown in FIGS. 8A-8G) corresponds to a fully disassembled or exploded view of a pair of earpiece-less eyeglasses in FIGS. 7A and 7B. The earpiece-less eyeglasses 700 of FIGS. 7A, 7B and 7A-8G may include some or all of the parts of the eyeglasses 100 of FIGS. 1-6 even if not explicitly stated, and the eyeglasses 700 may be considered to be a modification of the eyeglasses 100 of FIGS. 1-6. However, modifications may be made, such as replacing the plastic attachment bar/groove connection means with a new metallic assembly discussed below.

The pre-assembly pair of earpiece-less eyeglasses 700 in FIGS. 7A and 7B correspond to the fully-assembled pair of earpiece-less eyeglasses 700 in FIGS. 8A-8G and 11A discussed below (and correspond to the almost fully-assembled earpiece-less eyeglasses 700 of FIG. 11B).

According to an embodiment, as shown in FIGS. 7A and 7B, the left (pre-assembly or disassembled) eye unit 720 (of FIGS. 8A-8G and 11A) may include left eye frame (or eyeglasses frame) 721, protective lens 724A, magnification lens 724B, sleeve 724C, and attachment mechanism 724D. Likewise, the right (pre-assembly or disassembled) eye unit 740 may include right eye/eyeglasses frame 741, protective lens 744A, magnification lens 744B, sleeve 744C, and attachment mechanism 744D.

According to an embodiment, as shown in FIGS. 7A and 7B, the left eye frame (or eyeglasses frame) 721 may include a receiving through hole 721A, a vent 721B, a lens alignment protrusion 721C, an outer rim 721D, a visor 721E and a string cap receiving portion 728A. The right eyeglass frame 741 may include a receiving through hole 741A, a vent 741B, a lens alignment protrusion 741C, an outer rim 741D, a visor 741E and a string cap receiving portion 728A.

According to an embodiment, as shown in FIGS. 7A and 7B, the through hole 721A may be configured to interact with (e.g., attach/fasten to) at least a portion of connectors 730, and the through hole 741A may be configured to interact with (e.g., attach/fasten to) at least a portion of connectors 750. Each of the connectors 730 and 750 may be configured to attach/fasten to the nose piece 760. Each of the connectors 730 and 750 are discussed in more detail below with regard to FIGS. 9A and 9B.

According to an embodiment, as shown in FIGS. 7A and 7B, the vents 721B and 741B may correspond to grating in the left and right eyeglass frames 721 and 741, and may include vent holes. The lens alignment protrusions 721C and 741C are contoured to fit with (or engage with) the alignment notch 724A1 in the protective lens 724A and the alignment notch 744A1 in the protective lens 744A, respectively. Because of the alignment notches 724A1 and 744A1, the protective lenses 724A and 744A may have original Pac-man video game character type shape. The protective lenses 724A and 744A may each be transparent.

According to an embodiment, as shown in FIGS. 7A and 7B, the left eyeglass frame 721 may include an outer rim surface 721D and the right eyeglass frame 741 may include an outer rim surface 741D (e.g., outer meaning away from the wearer). The outer rim surfaces 721D and 741D may include nub receiving portions 770. The nub receiving portions 770 may be small holes (e.g., the diameter of a sewing pin) and interact with nubs 775 of the left eye attachment mechanism 724D and the right eye attachment mechanism 744D, respectively. The protective lenses 724A and 744A may be glued into the frames 721 and 741, respectively (e.g., such that the nub receiving portions 770 surround the lenses 724A, 744A).

The left eye visor 721E and right eye visor 741E may include safety material to guard against impact and eye safety.

According to an embodiment, as shown in FIGS. 7A and 7B, the left eye attachment mechanism 724D may be snapped together to the left eye frame 721 by snapping the nubs 775 (of the left eye attachment mechanism 724D) to the nub receiving holes 770 of the left eye frame 721. Likewise, the right eye attachment mechanism 744D may be snapped together to the right eye frame 741 by snapping the nubs 775 (of the right eye attachment mechanism 744D) to the nub receiving holes 770 of the right eye frame 741. Prior to snapping the nubs 775 to the nub receiving holes 770, glue may be placed on the nubs 775 or in the nub receiving holes to ensure permanent contact.

According to an embodiment, as shown in FIGS. 7A and 7B, the left eye attachment mechanism 724D and the right eye attachment mechanism 744D may each include a stepped lower surface (steps 724D1 and 744D1), as shown in FIGS. 7A and 7B. The stepped lower surfaces 724D1 and 744D1 may correspond to a depth of a magnification lens. For example, the left eye unit 720 (shown in FIGS. 8C) may provide a left eye lens pocket configured to hold and snuggly fit a left eye lens (e.g., magnification lens 724B) in the left eye lens pocket, and the right eye unit 740 (shown in FIGS. 8B) may provide a right eye lens pocket configured to hold and snuggly fit a right eye lens (e.g., magnification lens 744B) in the right eye lens pocket.

According to an embodiment, as shown in FIGS. 7A, 7B, 8B and 8C, the left eye unit 720 provides a left opening of the left eye pocket on an outer left surface of the left eye frame, and the right eye frame provides a right opening of the right eye pocket on an outer right surface of the left eye frame. The left eye lens pocket may have a boundary comprised of the left eye frame 721 and the left eye attachment mechanism 724D (when the nubs 775 of the left eye attachment mechanism 724D are received/engaged in the nub receiving holes 770 of the left eye frame), and the right eye lens pocket may have a boundary comprised of the right eye frame 741 and the right eye attachment mechanism 744D (when the nubs 775 of the right eye attachment mechanism 744D are received/engaged in the nub receiving holes 770 of the right eye frame 741). Accordingly, an opening to a lens pocket may be provided on the left side of the left eye frame 721 and an opening to another (right eye) lens pocket may be provided on the right side of the right eye frame 741.

The pre-assembly pair of earpiece-less eyeglasses 700 in FIGS. 7A and 7B correspond to the fully-assembled pair of earpiece-less eyeglasses 700 in FIGS. 8A-8G. The eyeglasses 700 of FIGS. 8A-8G may incorporate parts or all of the eyeglasses 100 of FIGS. 1-6. Unless explicitly stated otherwise, the eyeglasses 700 may include features discussed above with relation to FIGS. 1-6.

Figure 8A:
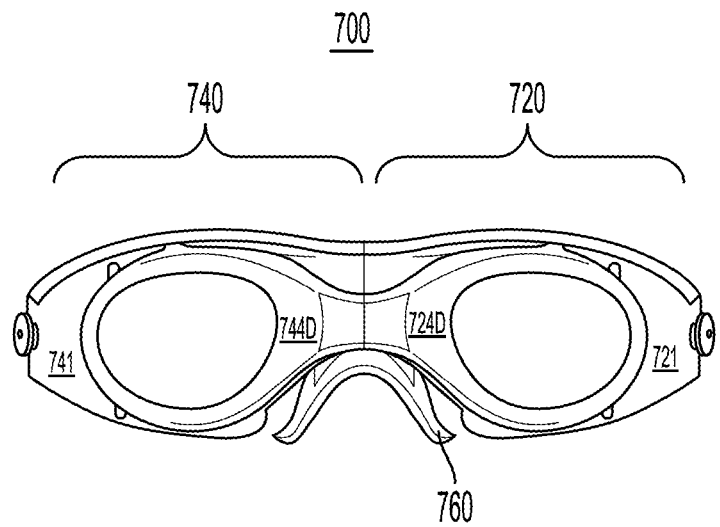
FIG. 8A illustrates a front view of a pair of earpiece-less eyeglasses, according to an embodiment of the disclosure.

FIG. 8A illustrates a front view of a pair of earpiece-less eyeglasses 700, according to an embodiment of the disclosure. FIG. 8A illustrates the eyeglasses 700 comprising a first (left side) eye unit 720 and a second (right side) eye unit 740 (left and right being from the perspective of the wearer of the eyeglasses 700 while wearing the eyeglasses 700). Unless stated explicitly otherwise, the bottom of the eyeglasses 700 is the side of having the nose piece 760 in FIG. 8A, the left side corresponds to the side of the eyeglasses 700 that left eye unit 720 is on compared to the side (the right side) that right eye unit 740 is on, and top side refers to an opposite side that the nose piece 760 is on.

Figures 8B, 8C:
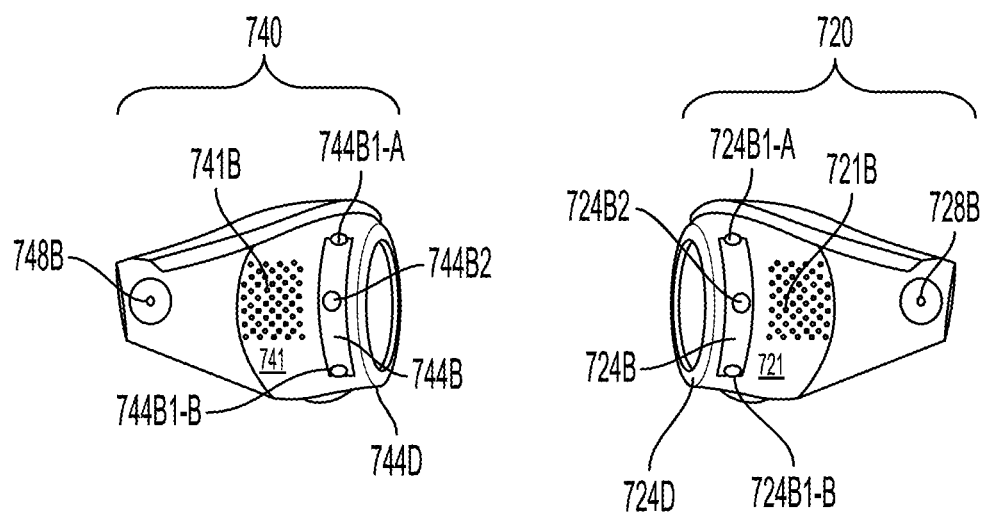
FIG. 8B illustrates a right side-view of a pair of earpiece-less eyeglasses, according to an embodiment of the disclosure.
FIG. 8C illustrates a left side-view of a pair of earpiece-less eyeglasses, according to an embodiment of the disclosure.

FIG. 8B illustrates a right side-view of a pair of earpiece-less eyeglasses 700 and FIG. 8C illustrates a left side-view of a pair of earpiece-less eyeglasses 700, according to an embodiment of the disclosure.

FIG. 8B shows the right eye magnification lens 744D covering the right opening of the right eye pocket (the right opening of the right eye frame 741 corresponds to the pocket (or gap area) that lens 744B is presently occupying). FIG. 8C shows the left eye magnification lens 724D covering the left opening of the left eye pocket (the left opening of the left eye frame 721 corresponds to the pocket (or gap area) that lens 724B is presently occupying).

While explaining the eyeglasses according to embodiments of the disclosure, a detailed description of the contents overlapping with the eyeglasses according to the embodiments will be omitted (e.g., left eye unit features, unless explicitly explained as being different, may operate similarly, according to various embodiments).

As shown in FIGS. 7A, 7B, 8B and 8C, left (or left eye) magnification lens 724B includes protrusions 724B1-A and 724B1-B provided on an outer surface of the left eye magnification lens 724B, and right (or right eye) magnification lens includes protrusions 744B1-A and 744B1-B provided on an outer surface of the lens 744B. The protrusions, which also may be referred to as nubs, are graspable and used for engagement with a human's hand so that the human may remove and replace a magnification lens. For example, a left eye lens and a right eye lens may include at least a pair of external protrusions, and the respective pairs of external protrusions are each configured to be gripped by an opposable thumb and finger and pulled away from the nose piece by a pulling force made on the gripped lens.

Figure 10:
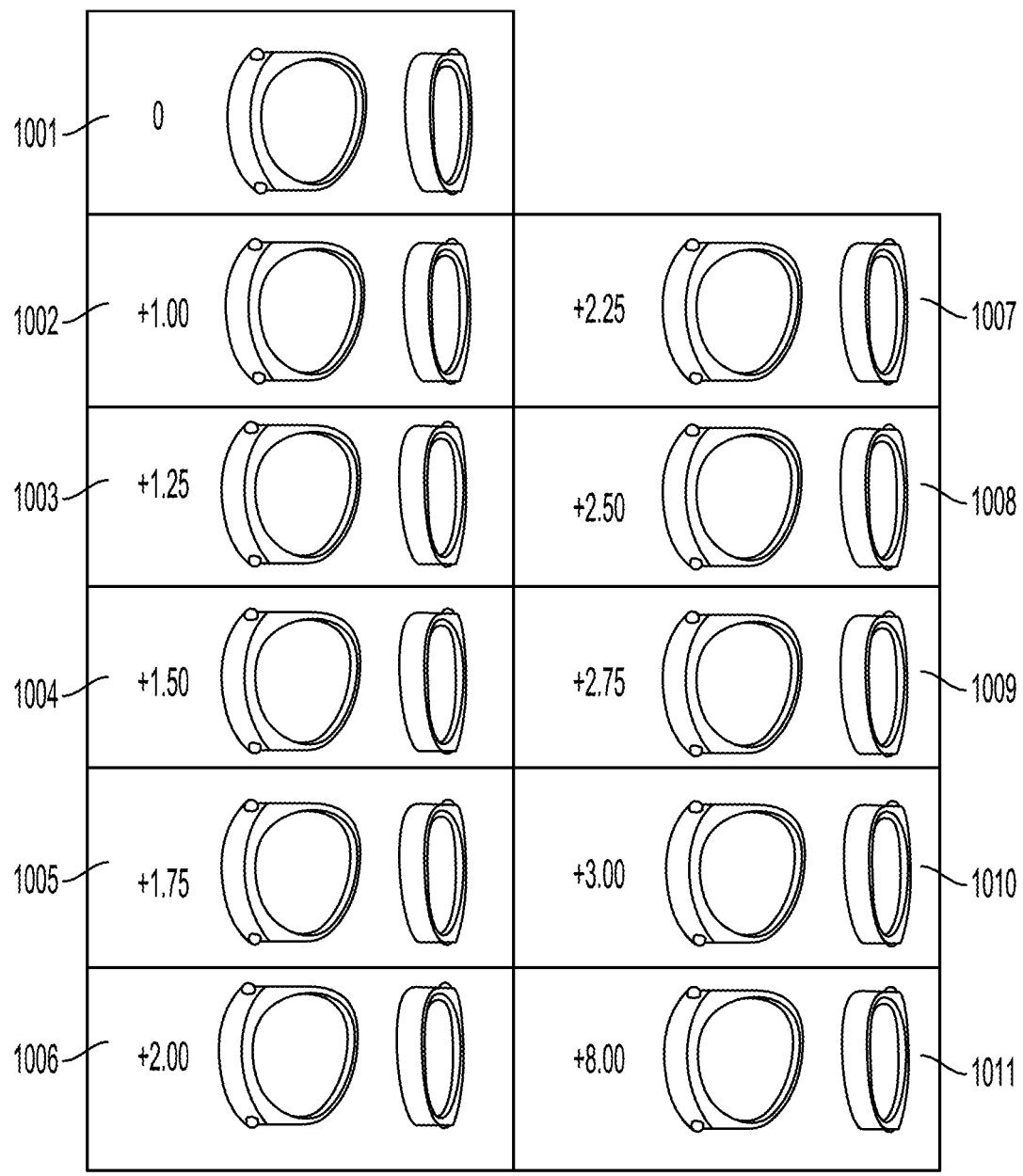
FIG. 10 illustrates pairs of left and right magnification lenses, according to an embodiment of the disclosure.

According to an embodiment, as shown in FIGS. 7A and 7B, each magnification lens 724B and 744B may include an indication 724B2 and 744B2 of an individual level of magnification (e.g., 0, +1.00, +1.25, etc.) corresponding to a strength of the magnification lens. FIG. 10 also shows various examples of various pairs of magnification lenses that may be used as magnification lens 724B and 744B and their corresponding magnification strengths (e.g., 0, +1.00, +1.25, etc.).

Sleeve 724C snuggly fits into or onto magnification lens 724B (e.g., prior to insertion into the pocket). The sleeves 724C, 744C are configured to provide sunglasses (light dimming) functionality, night driving functionality, sleeping and/or blue light blockage functionality.

Figure 8D:
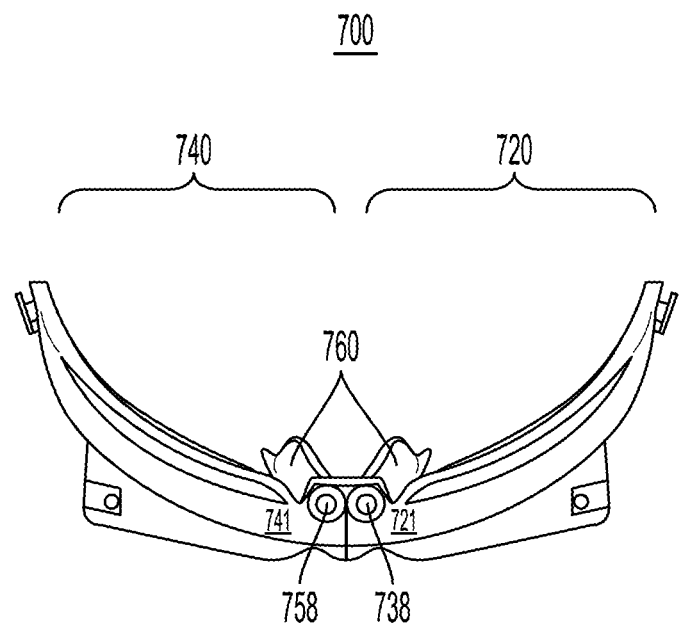
FIG. 8D illustrates a bird's eye (top) view of a pair of earpiece-less eyeglasses, according to an embodiment of the disclosure.
Figure 8E:
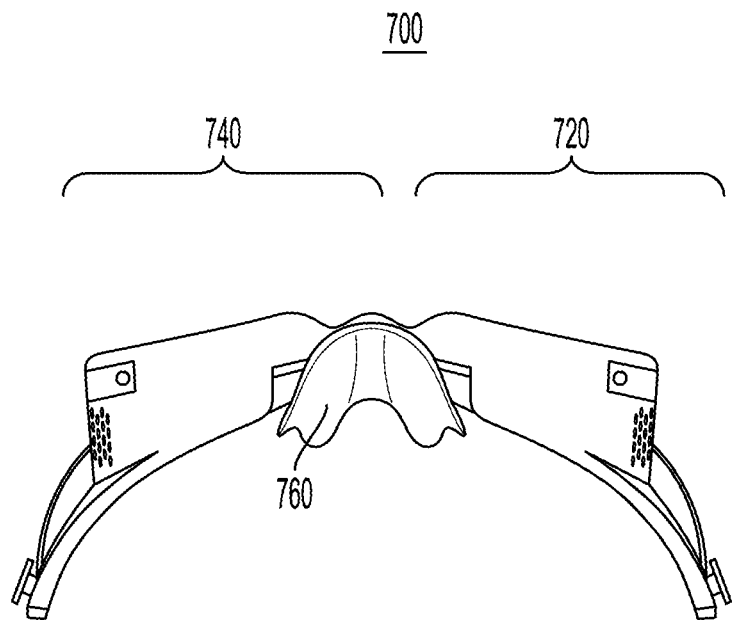
FIG. 8E illustrates a bottom view of a pair of earpiece-less eyeglasses, according to an embodiment of the disclosure.
Figure 8F:
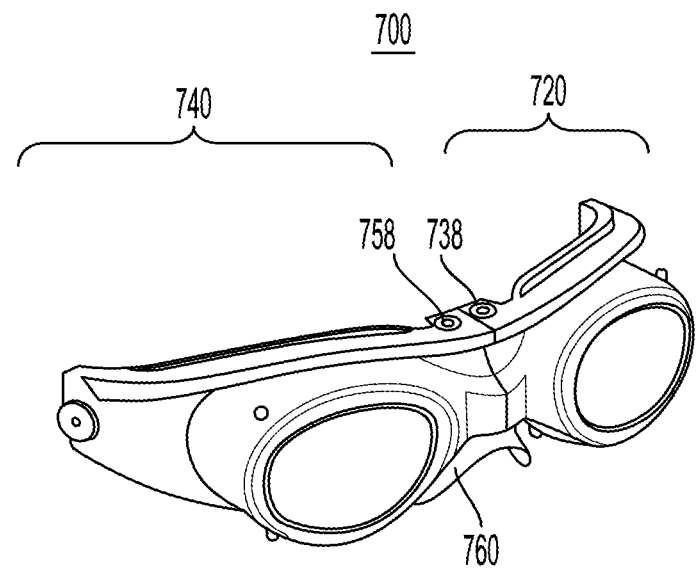
FIG. 8F illustrates a front right side-perspective view of a pair of earpiece-less eyeglasses, according to an embodiment of the disclosure.
Figure 8G:
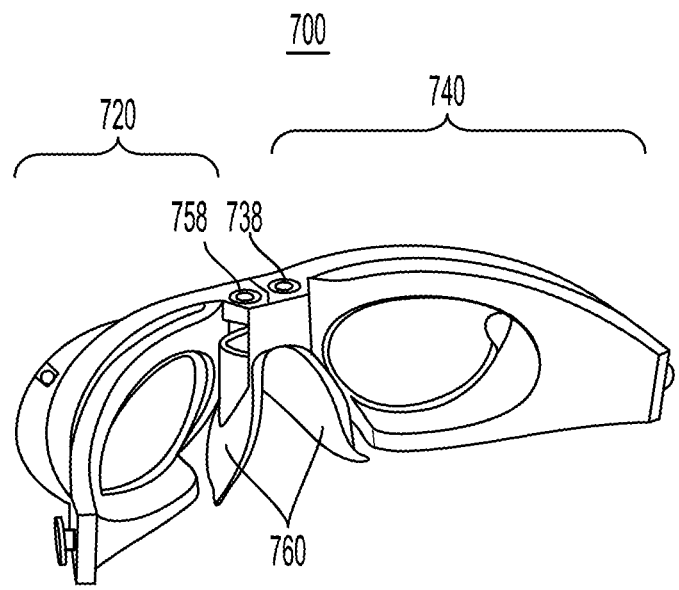
FIG. 8G illustrates a rear left side-perspective view of a pair of earpiece-less eyeglasses, according to an embodiment of the disclosure.

According to one or more embodiments of the disclosure, FIG. 8A illustrates a front view of a pair of earpiece-less eyeglasses 700, FIG. 8B illustrates a right side-view of a pair of earpiece-less eyeglasses 700, FIG. 8C illustrates a left side-view of a pair of earpiece-less eyeglasses 700, FIG. 8D illustrates a bird's eye (top) view of a pair of earpiece-less eyeglasses 700, FIG. 8E illustrates a bottom view of a pair of earpiece-less eyeglasses 700, FIG. 8F illustrates a front right side-perspective view of a pair of earpiece-less eyeglasses 700 and FIG. 8G illustrates a rear left side-perspective view of a pair of earpiece-less eyeglasses 700.

FIGS. 8A-8G show a fully assembled version of eyeglasses 100 comprised of the pieces of the pre-assembly/disassembled eyeglasses from FIGS. 7A and 7B.

As shown in FIGS. 7A, 8B and 8C, the string cap receiving portion 728A may be configured to detachably connect with string cap 728B. The connecting of the string cap 728B with the string cap receiving portion 728A may be configured to stably fasten or hold the eyeglasses 700 to a wearer's face via a secure fit string or elastic band (e.g., to ensure contact with face even if wind is blowing, contact with face may provide eye enclosure that prevents harmful fumes/irritants/contaminants from irritating the eyes, thereby functioning as both a safety and as a functional tool). Using the string or elastic band allows the wearer to place a string/band around the string cap 728B (ring) and around the ear (like a face mask) for added security. After a portion of the string is placed around a wearer's ear, the eyeglasses 700 may be more firmly held against a wearer's face (e.g., for outdoors in heavy winds for secure holding power). Double-sided tape can also be added inside of the nose cavity and/or on the insides of the left and right frames (i.e., on an opposite side of the nub receiving holes 770).

Figure 9A:
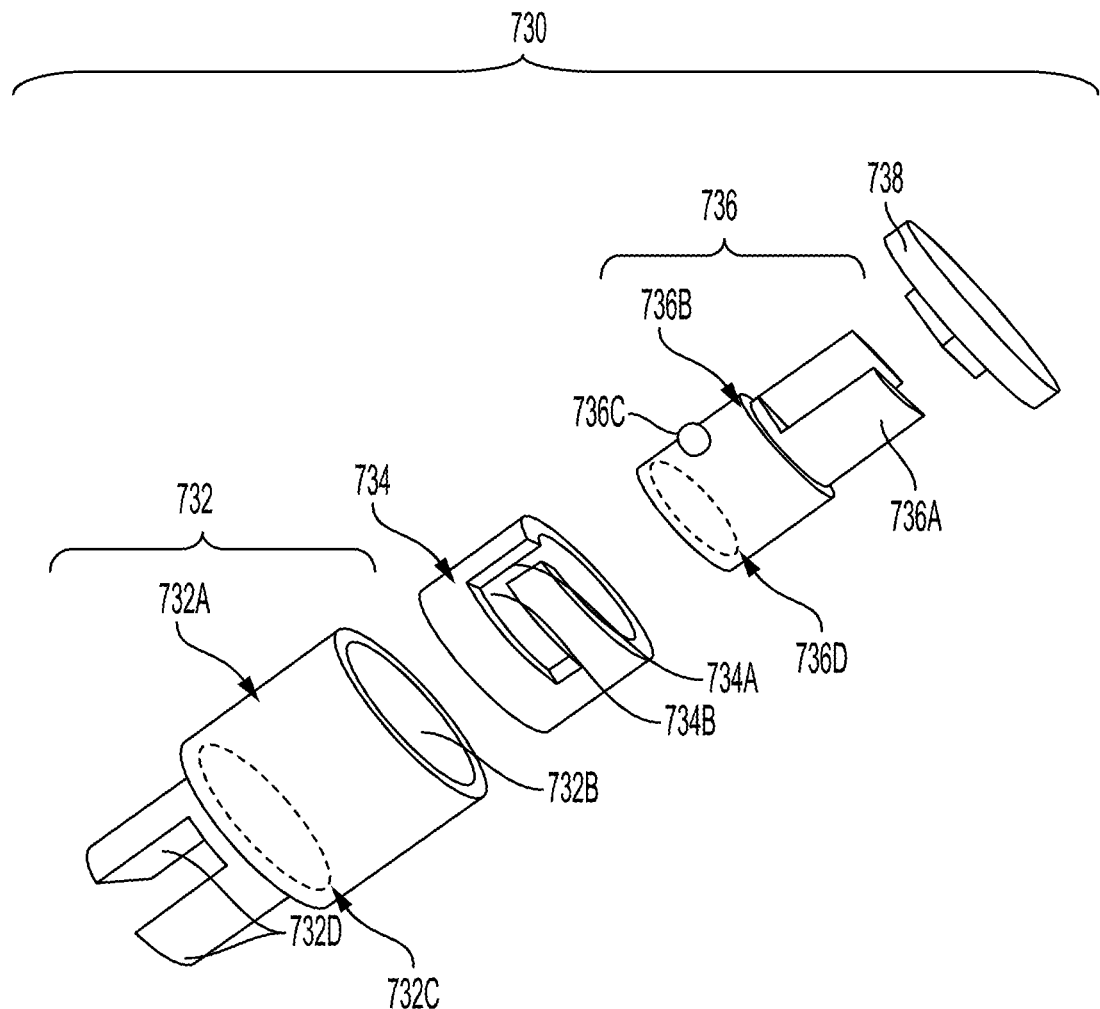
FIG. 9A illustrates a disassembled (pre-assembly) perspective view of a left side metallic assembly, according to an embodiment of the disclosure.
Figure 9B:
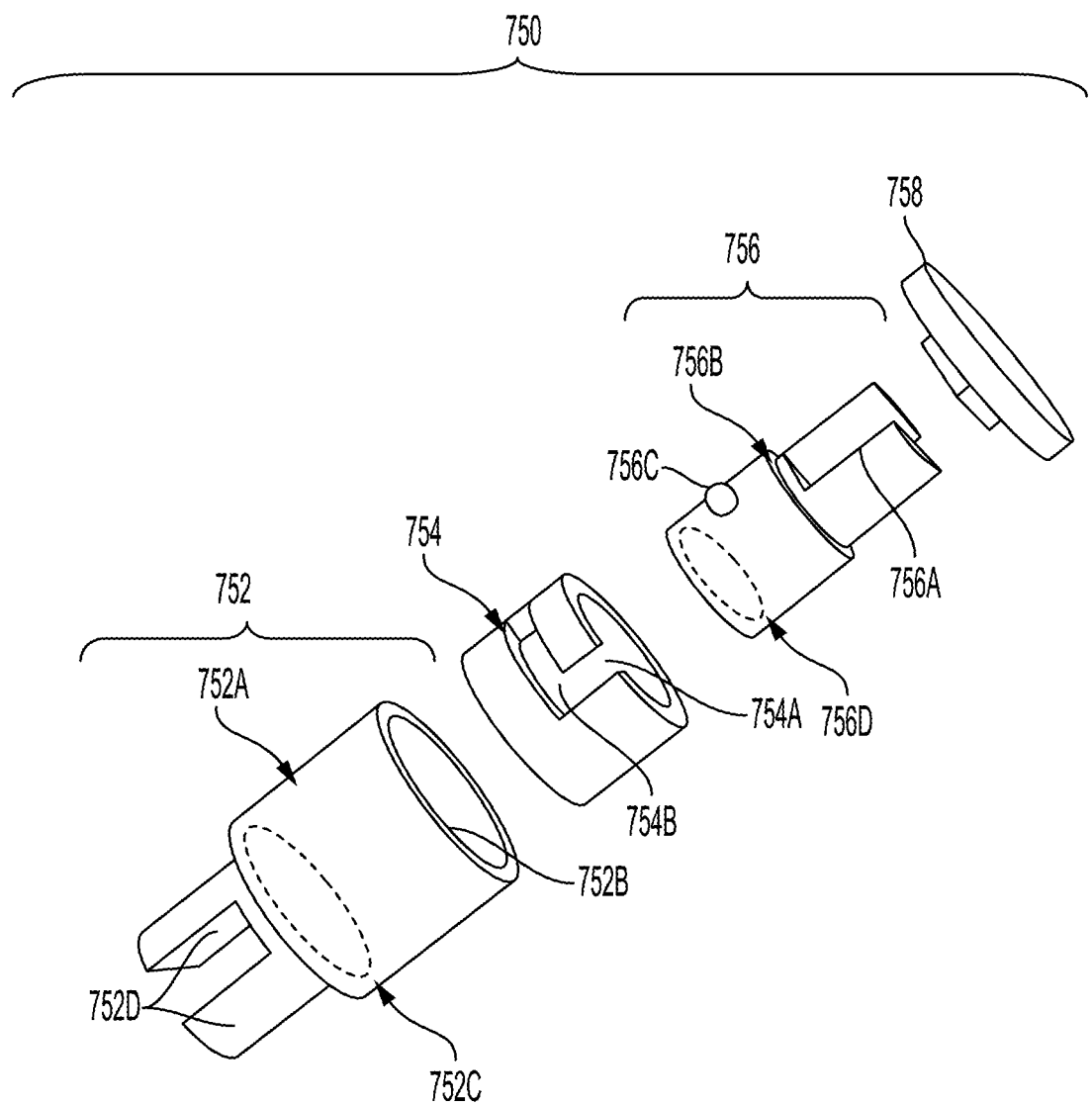
FIG. 9B illustrates a disassembled (pre-assembly) perspective view of a right-side metallic assembly, according to an embodiment of the disclosure.

FIG. 9A illustrates a disassembled (pre-assembly) perspective view of a left side (first) metallic assembly 730, according to an embodiment of the disclosure. FIG. 9B illustrates a disassembled (pre-assembly) perspective view of a right side (second) metallic assembly 750, according to an embodiment of the disclosure. The metallic assemblies 730 and 750 may also be referred to as connectors or attaching means. The first metallic assembly 730 and the second metallic assembly 750 each separate so that one part is attached to the goggle frame and the other part is attached to the nose piece 160.

As shown in FIGS. 9A and 9B, the connectors may include a left connector 730 and a right connector 750. The left connector 730 and the right connector 750 may be made of metal.

A left eye frame attaching means 730 may comprise all or part of the left connector 730 and a right eye frame attaching means 750 may comprise all or part of the right connector 750.

Figure 11A:
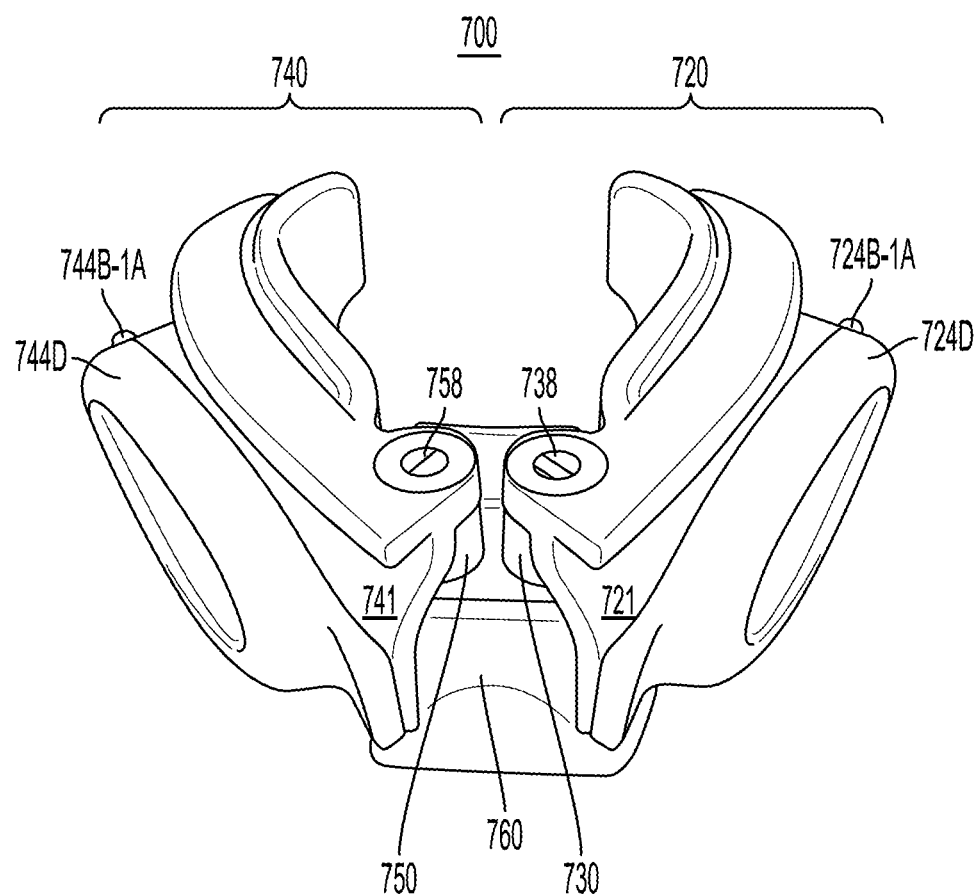
FIG. 11A illustrates a front bird's eye perspective (front top perspective) view of a pair of earpiece-less eyeglasses with the frames in an unextended position, according to an embodiment of the disclosure.
Figure 11B:
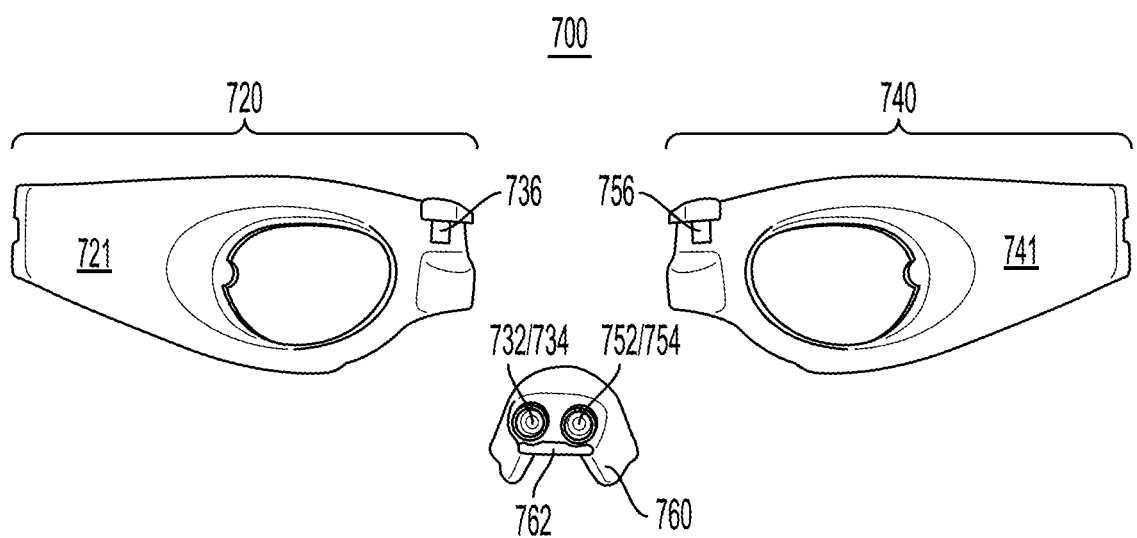
FIG. 11B illustrates a rear view of a pair of earpiece-less eyeglasses with the nose piece and frames in an unattached state, according to an embodiment of the disclosure.

As shown in FIGS. 11A and 11B, the nose piece 760 is connected to, and thereby provides, at least a portion of the left eye frame attaching means 730 and the nose piece 760 is also connected to, and thereby provides, at least a portion of a right eye frame attaching means 750. The left eye frame attaching means 730 removably attaches the left eye frame 721 (and hence the left eye unit 720) to the nose piece 760, and the right eye frame attaching means 750 removably attaches the right eye frame 741 (and hence the right eye unit 740) to the nose piece 760.

As shown in FIG. 9A, a first (left) metal connector 730 may include a first lower magnetic connection portion 732, a locking portion 734, a first upper magnetic connection portion 736 and a top circular cap 738. As shown in FIG. 9B, a second (right) metal connector 750 may include a first lower magnetic connection portion 752, a locking portion 754, a first upper magnetic connection portion 756 and a top circular cap 758.

As shown in FIG. 9A, the first magnetic connection portion 732 may include a base portion 732A, a female receiving portion 732B, a first magnet 732C and a nose piece engaging portion 732D. The magnet 732C (shown by dotted lines) may be affixed inside of the base portion 732A. The first magnetic connection portion 752 may include a base portion 752A, a female receiving portion 752B, a magnet 752C and a nose piece engaging portion 752D. The magnet 752C (shown by dotted lines) may be affixed inside of the base portion 752A.

As shown in FIG. 9A, the locking portion 734 may include a channel comprising a first channel portion 734A and a second channel portion 734B. As shown in FIG. 9B, the locking portion 754 may include a channel comprising a first channel portion 754A and a second channel portion 754B. The locking portions 734 and 754 may be glued into the first magnetic connection portion 732 and the second magnetic connection portion 752, respectively.

According to an embodiment, as shown in FIGS. 9A, 11A and 11B, the portion of the left eye frame attaching means 730 included in the nose piece 760 includes a left eye frame receiving channel (734A, 734B), and the first channel portion 734A may be perpendicular to the second channel portion 734B. According to an embodiment, as shown in FIGS. 9B, 11A and 11B, the portion of the right eye frame attaching means 750 included in the nose piece 760 includes a right eye frame receiving channel (754A, 754B), and the first channel portion 754A may be perpendicular to the second channel portion 754B.

As shown in FIG. 9A, the second magnetic connection portion 736 of connector 730 includes a cap receiving portion 736A affixed to a top surface of a cylindrical base portion 736B. As shown in FIG. 9B, the second magnetic connection portion 756 of connector 750 includes a cap receiving portion 756A affixed to a top surface of a cylindrical base portion 756B.

As shown in FIGS. 9A and 9B, the cylindrical base portion 736B of the connector 730 (left eye frame attaching means) includes a connecting pin 736C (left eye frame connecting pin) affixed to an outer radially curved surface of the cylindrical base portion 736B (left eye frame column extending from the left eye frame), and the cylindrical base portion 756B of the connector 750 (right eye frame attaching means) includes a connecting pin 756C (right eye frame connecting pin) affixed to an outer radially curved surface of the cylindrical base portion 756B (left eye frame column extending from the left eye frame). The cylindrical base portions 736B and 756B may include a second magnet 736D inside (shown by dotted lines in FIGS. 9A and 9B) and a second magnet 756D inside (shown by dotted lines in FIGS. 9A and 9B), respectively provided at respective bottom flat surfaces of the respective cylindrical base portions. The left eye frame column and the right eye frame column are each cylindrically-shaped columns.

As shown in FIG. 9A, the left eye frame receiving channel 734A, 734B is configured to engage with the left eye frame connecting pin 736C and hold the left eye frame stably to the nose piece when engaged (e.g., when the connecting pin 736C enters the first channel portion 734A and subsequently enters the second channel portion 734B, thereby snap-fitting and/or locking the second magnetic connector 736 to the locking portion 734). As shown in FIG. 9B, the right eye frame receiving channel 754A, 754B is configured to engage with the right eye frame connecting pin 756C and hold the right eye frame stably to the nose piece when engaged (e.g., when the connecting pin 756C enters the first channel portion 754A and subsequently enters the second channel portion 754B, thereby snap-fitting and/or locking the second magnetic connector 756 to the locking portion 754). In other words, when the little pin goes inside the channel it will snap together. When snap-fit/locked into place, the eyeglass frames are pulled closer to the wearer's face, and the snap-fitting/locking only allows the pin to go one way so that when snapped together, the eyeglass frame moves in towards your face and/or temples to help with a face hugging attribute. The eyeglass frames thus pivot around the nose guard.

According to an embodiment, as shown in FIG. 9A, the left eye frame attachment means 730 may include a first magnetic connector 732, the left eye frame receiving channel 734A, 734B, and a second magnetic connector 736 comprising the left eye frame column 736B having the connection pin 736C. According to an embodiment, as shown in FIG. 9B, the right eye frame attachment means 750 may include a first magnetic connector 752, the right eye frame receiving channel 754A, 754B, and a second magnetic connector 756 comprising the left eye frame column 756B having the connection pin 756C. There is a grooved channel inside each of the metallic nose connector assemblies wherein the respective eyeglasses/goggle frame part metallic connector has a pin that will travel inside the channel so that the goggle frame can adjust to a person's facial dimensions and also collapse for easy traveling (FIG. 11A shows a collapsed/folded version).

As shown in FIG. 9A, the first magnet 732C and the second magnet 736D, each of the first connector 730, may be magnetically attracted to one another. The first magnet 752C and the second magnet 756D, each of the first connector 750, may be magnetically attracted to one another. The magnetically attracted magnet pairs, in combination with the snap fit (connector pin/channel) configuration are used to hold the eyeglass frames stably to the nose piece. The magnets may connect (via magnetization held by magnetic force) and temporarily stay together until pulled apart.

According to an embodiment, as shown in FIG. 11B, at least one of the first magnetic connection portion 732 and the corresponding locking portion 734 may be integrated (e.g., attached and glued) into a nose piece 760, and at least one of the second magnetic connection portion 752 and the corresponding locking portion 754 may be integrated (e.g., attached and glued) into a nose piece 760. For example, the nose piece engaging portion 732D of the left connector 730 may be pushed into left connector receiving hole 761 of the nose piece 760 and the nose piece engaging portion 752D of the right connector 750 may be pushed into right connector receiving hole 762 of the nose piece 760 (see, e.g., FIGS. 7A, 7B, 9A and 9B).

As shown in FIGS. 9A and 9B, the locking portions (734, 754) may be provided in the female receiving portions (732B, 752B) and may be affixed to the bottom of the female receiving portions (732B, 752B), e.g., by glue or simultaneously molded in the injection process. As shown in FIG. 7B, the second (top left) magnetic connection portion 736 may be integrated into a left eye unit frame 721, such as at a position of through hole 721A.

As shown in FIGS. 8D and 11A, top circular cap piece 738 attaches to a top of a first eye unit frame 721 and top circular cap piece 758 attaches to a top of a second eye unit frame 741.

As shown in FIGS. 9A, 9B and 11B, the left first magnetic connection portion 732 and the right first magnetic connection portion 752 may be attached to the nose piece 760. The left second magnetic connection portion 736 may be attached to the first eye unit frame 721. The right second magnetic connection portion 756 may be attached to the second eye unit frame 741.

FIG. 9A shows the left eye frame attaching means 730 (i.e., the four components of the connector 730 in FIG. 9A) includes a left eye frame magnet 732C provided in the left first magnetic connection portion 732, and a left eye nose magnet 736D provided in the second magnetic connection portion 736. FIG. 11B shows the left first magnetic connector portion 732 may be provided in and affixed to the nose piece 760 and the left second magnetic connection portion 736 may be affixed to the left eye frame 721. FIG. 9B shows the right eye frame attaching means 750 (i.e., the four components of the connector 750 in FIG. 9B) includes a right eye frame magnet 752C provided in the right first magnetic connection portion 752, and a right eye nose magnet 756D provided in the right second magnetic connection portion 756. FIG. 11B shows the right first magnetic connector portion 752 may be provided in and affixed to the nose piece 760 and the right second magnetic connection portion 756 may be affixed to the right eye frame 741.

FIG. 10 illustrates pairs of left and right magnification lenses 1001-1011. The pairs of left and right magnification lens 1001-1011 include a numerical value corresponding to a magnification strength (e.g., 0 (zero) for magnification lens 1001, +1.00 for magnification lens 1002, etc.) on an outer surface of each lens. The replaceable magnification lens 724B and 744B of FIGS. 7A and 7B may correspond to the magnification lens 1001-1011. As shown in FIGS. 7A and 7B, the magnification lens 724B may be a left magnification lens and the magnification lens 744B may be a right magnification lens. A person of ordinary skill understands that a lens with a magnification strength selected from the magnification strength table of FIG. 10 may be modified to correspond to the left lens 724B and the right lens 744B.

FIG. 11A illustrates a front bird's eye perspective (front top perspective) view of a pair of earpiece-less eyeglasses 700 with the frames (left eye unit 721 and right eye unit 741) in an unextended position, according to an embodiment of the disclosure.

FIG. 11B illustrates a rear view of a pair of earpiece-less eyeglasses with the nose piece and frames in an unattached state, according to an embodiment of the disclosure. FIG. 11B shows how the left eye unit 720 and the right eye unit 740 may each be separated (e.g., so only one of the two are attached to the nose piece 760), e.g., when applying makeup and/or cutting hair, such as sideburns.

Additional Advantages: The design allows each frame to be independently removed so that the eyeglasses can be used with one eye frame attached to the nose piece. In addition, instead of the entire eye frame or entire pair of eyeglasses having to be replaced, the improvement allows for prescription and magnified lenses to be inserted into the side of the eye frames via a pocket, which may occur while the eyeglasses are being worn. The eyeglass frames can be independently separated from the nose piece so that cosmetics can be applied to each eye without any interference. Also, there are no ear temples to get in the way of styling one's hair or cutting one's sideburns while wearing the eyeglasses. There are three layers of protection for each eye. The outside goggle lens 724D, 744D, the lens itself 724B, 744B and the inside goggle lens 724A, 744A. Each lens can be treated differently for different purposes such as anti-fogging, polarization, or shock proof, etc. The eyeglasses 700 can balance on one's nose independent of an elastic strap or temples by gravity or by double sided tape. An elastic band can be added for extra security when outside in high winds. The eyeglasses 700 protect the eyes from contaminants, hairspray and environmental, and biological.

While explaining the eyeglasses according to embodiments of the disclosure, a detailed description of the contents overlapping with the eyeglasses according to the embodiments will be omitted.

The pre-assembly pair of earpiece-less eyeglasses 700 correspond to the fully-assembled pair of earpiece-less eyeglasses 700 in FIGS. 8A-8G and 11A discussed below (and correspond to the almost fully-assembled earpiece-less eyeglasses 700 of FIG. 11B).

Although exemplary embodiments have been shown and described, the disclosure is not limited thereto, and various modifications and variations are possible within the scope of the appended drawings and the detailed description. It will be appreciated by those skilled in the art that changes may be made in these exemplary embodiments without departing from the principles and spirit of the general inventive concept, the scope of which is defined in the appended claims and their equivalents.

The invention claimed is:
1. Earpiece-less glasses comprising:
a left eye frame and a right eye frame; and
a nose piece connecting the left eye frame to the right eye frame, wherein
the left eye frame provides a first left eye lens and a left eye lens pocket configured to hold and snuggly fit a second left eye lens in the left eye lens pocket,
the right eye frame provides a first right eye lens and a right eye lens pocket configured to hold and snuggly fit a second right eye lens in the right eye lens pocket,
the left eye lens pocket is configured to snuggly hold the second left eye lens and the right eye lens pocket is configured to snuggly hold the second right eye lens,
the left eye frame provides a left opening of the left eye lens pocket on an outer left surface of the left eye frame, and
the right eye frame provides a right opening of the right eye lens pocket on an outer right surface of the right eye frame.

2. The earpiece-less glasses of claim 1, wherein the second left eye lens and the second right eye lens are each configured to be gripped by an opposable thumb and finger and pulled away from the nose piece.

3. The earpiece-less glasses of claim 1, wherein the second left eye lens and the second right eye lens each include at least a pair of external protrusions, and the respective pairs of external protrusions are configured to be gripped by an opposable thumb and finger and pulled away from the nose piece by pulling on the respective pair of external protrusions.

4. The earpiece-less glasses of claim 1, wherein
the nose piece provides at least a portion of a left eye frame attaching means and at least a portion of a right eye frame attaching means,
the left eye frame attaching means removably attaches the left eye frame to the nose piece, and
the right eye frame attaching means removably attaches the right eye frame to the nose piece.

5. The earpiece-less glasses of claim 4, wherein
the left eye frame attaching means includes at least one of a left eye frame magnet provided in the left eye frame or a left eye nose magnet provided in the nose piece, and
the right eye frame attaching means includes at least one of a right eye frame magnet provided in the right eye frame or a right eye nose magnet provided in the nose piece.

6. The earpiece-less glasses of claim 4, wherein
the portion of the left eye frame attaching means included in the nose piece includes a left eye frame receiving channel, and
the portion of the right eye frame attaching means included in the nose piece includes a right eye frame receiving channel.

7. The earpiece-less glasses of claim 6, wherein
the left eye frame attaching means includes a left eye frame connecting pin provided on a left eye frame column extending from the left eye frame,
the right eye frame attaching means includes a right eye frame connecting pin provided on a right eye frame column extending from the right eye frame,
the left eye frame receiving channel is configured to engage with the left eye frame connecting pin and hold the left eye frame stably to the nose piece, and
the right eye frame receiving channel is configured to engage with the right eye frame connecting pin and hold the right eye frame stably to the nose piece,
the left eye frame attaching means comprises the left eye frame receiving channel, the left eye frame column and the left eye connection pin, and
the right eye attaching means comprises the night eye frame receiving channel, the right eye frame column and the right eye frame connection pin.

8. The earpiece-less glasses of claim 7, wherein the left eye frame column and the night eye frame column are each cylindrically-shaped columns.

9. The earpiece-less glasses of claim 6, wherein the left eye frame receiving channel includes a first left eye channel portion and a second left eye channel portion perpendicular to the first left eye channel portion, and the right eye frame receiving channel includes a first right eye channel portion and a second right eye channel portion perpendicular to the first right eye channel portion.

10. The earpiece-less glasses of claim 1, wherein the first left eye lens and the first left eye lens each include a magnification lens and graspable protrusions.

11. The earpiece-less glasses of claim 1, further comprising a third left eye lens and a third right eye lens, wherein the first left eye lens and the third left eye lens are configured to provide the left eye lens pocket configured to hold and snuggly fit the second left eye lens in the left eye lens pocket, and the first right eye lens and the third right lens are configured to provide the right eye lens pocket configured to hold and snuggly fit the second right eye lens in the right eye lens pocket.

12. A method of changing an eyeglass lens while a pair of eyeglasses is being worn, the method comprising:
providing a pair of eyeglasses worn by a wearer, the pair of eyeglasses including two eye unit frames, and the two eye unit frames include a left eye unit frame and a right eye unit frame, the left eye unit frame including a first left eyeglass lens and a second left eyeglass lens, the right eye unit frame including a first right eyeglass lens and a second right eyeglass lens, the second left eyeglass lens being provided within a pocket of the left eye unit frame, and the second right eyeglass lens being provided within a pocket of the right eye unit frame, the second left eyeglass lens including nubs provided on an outer edge surface of the second left eyeglass lens and the second right eyeglass lens including nubs provided on an outer surface of the second right eyeglass lens;
gripping, using an opposable thumb and finger, at least one of the nubs of the second left eyeglass lens or the nubs of the second right eyeglass lens;
moving, using the gripped nubs of the second left eyeglass lens or the second right eyeglass lens, the second left eyeglass lens or the second right eyeglass lens in a lateral direction away from a nose area of the pair of eyeglasses worn by a wearer.

13. The method of changing the eyeglass lens while the pair of eyeglasses is being worn of claim 12, providing a third left eye lens and a third right eye lens such that the first left eye lens and the third left eye lens provide the left eye lens pocket configured to hold and snuggly fit the second left eye lens in the left eye lens pocket, and the first right eye lens and the third right lens provide the right eye lens pocket configured to hold and snuggly fit the second right eye lens in the right eye lens pocket.

14. The method of changing the eyeglass lens while the pair of eyeglasses is being worn of claim 12, further comprising:

providing a left eye frame receiving channel and a right eye frame receiving channel in the nose piece, wherein the left eye frame receiving channel includes a first left eye channel portion and a second left eye channel portion perpendicular to the first left eye channel portion, and the right eye frame receiving channel includes a first right eye channel portion and a second right eye channel portion perpendicular to the first right eye channel portion.

15. A method of assembling earpiece-less glasses comprising: providing a first earpiece-less eyeglass frame configured to be used with a human's left eye and providing a second earpiece-less eyeglass frame configured to be used with a human's right eye;

providing a nose piece having two hollow cylindrical receiving portions;

connecting the two earpiece-less eyeglass frames to the two hollow cylindrical receiving portions of the nose piece via an attachment means; and attaching a first left eye lens to the first earpiece-less eyeglass frame to create at least a part of a left eye lens pocket configured to hold and snuggly fit a second left eye lens in the left eye lens pocket and attaching a first right eye lens to the second earpiece-less eyeglass frame to create at least a part of a right eye lens pocket configured to hold and snuggly fit a second right eye lens in the right eye lens pocket, wherein the left eye lens pocket includes a left opening on an outer left surface thereof, and the right eye lens pocket includes a right opening on an outer right surface thereof.

16. The method of assembling a pair of eyeglasses according to claim 15, further comprising:

attaching two metal connectors inside of the receiving portions of the nose piece; and attaching two eye unit frames to the top two pieces of the metal connectors.

17. The method of assembling a pair of eyeglasses according to claim 15, further comprising providing a magnet inside of a top portion of a metal connector and a magnet inside of a bottom portion of the metal connector.

18. The method of assembling a pair of eyeglasses according to claim 15, further comprising snapping the top portion and the bottom portion together using a connection pin provided with the top portion and a channel provided in the bottom portion.

19. The method of assembling a pair of eyeglasses according to claim 15, further comprising:

providing a third left eye lens and a third right eye lens such that the first left eye lens and the third left eye lens provide the left eye lens pocket configured to hold and snuggly fit the second left eye lens in the left eye lens pocket, and the first right eye lens and the third right eye lens provide the right eye lens pocket configured to hold and snuggly fit the second right eye lens in the right eye lens pocket.

20. The method of assembling a pair of eyeglasses according to claim 15, further comprising:

providing a left eye frame receiving channel and a right eye frame receiving channel in the nose piece, wherein the left eye frame receiving channel includes a first left eye channel portion and a second left eye channel portion perpendicular to the first left eye channel portion, and the right eye frame receiving channel includes a first right eye channel portion and a second right eye channel portion perpendicular to the first right eye channel portion.

* * * * *